United States Patent
Matsuura et al.

(10) Patent No.: US 10,700,383 B2
(45) Date of Patent: Jun. 30, 2020

(54) NONAQUEOUS ELECTROLYTE SECONDARY BATTERY AND PRODUCTION METHOD THEREOF

(71) Applicant: TOYOTA JIDOSHA KABUSHIKI KAISHA, Toyota-shi, Aichi-ken (JP)

(72) Inventors: Tomohiro Matsuura, Toyota (JP); Yukio Harima, Hirakata (JP); Hiroaki Imanishi, Moriguchi (JP); Ichiro Murata, Settsu (JP); Kiyomi Kozuki, Moriguchi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 15/925,302

(22) Filed: Mar. 19, 2018

(65) Prior Publication Data

US 2018/0287210 A1 Oct. 4, 2018

(30) Foreign Application Priority Data

Mar. 30, 2017 (JP) ................................. 2017-068730

(51) Int. Cl.
*H01M 10/0525* (2010.01)
*H01M 10/0585* (2010.01)
(Continued)

(52) U.S. Cl.
CPC ....... *H01M 10/0585* (2013.01); *H01M 2/266* (2013.01); *H01M 2/34* (2013.01);
(Continued)

(58) Field of Classification Search
CPC ................................ H01M 2/263; H01M 2/30
See application file for complete search history.

(56) References Cited

U.S. PATENT DOCUMENTS

| | | | |
|---|---|---|---|
| 2002/0015892 A1* | 2/2002 | Kitoh | B60K 6/28 429/243 |
| 2007/0117009 A1 | 5/2007 | Yamauchi et al. | |

(Continued)

FOREIGN PATENT DOCUMENTS

| | | |
|---|---|---|
| JP | H10-106536 A | 4/1998 |
| JP | 2003-173765 A | 6/2003 |

(Continued)

*Primary Examiner* — Olatunji A Godo
(74) *Attorney, Agent, or Firm* — Oliff PLC

(57) ABSTRACT

Provided is a nonaqueous electrolyte secondary battery that can be produced with high yield, through suppression of breakage of electrode collector portions during production and through suppression of damage to an electrode body during welding. The nonaqueous electrolyte secondary battery disclosed herein is provided with: an electrode body in which a plurality of electrodes are stacked; and a nonaqueous electrolyte. Each electrode has a collector and an active material layer formed on the collector. Each electrode has a collector portion being an active material layer non-forming portion. The collector portions of the electrodes are grouped and are clamped, in the stacking direction of the electrode body, by two or more members of an electrode collector terminal that is made up of the members. The collector portions of the electrodes and the members that clamp the collector portions are welded.

12 Claims, 14 Drawing Sheets

(51) Int. Cl.
  *H01M 2/26*    (2006.01)
  *H01M 2/34*    (2006.01)
  *H01M 10/04*   (2006.01)

(52) U.S. Cl.
  CPC ... *H01M 10/0468* (2013.01); *H01M 10/0525* (2013.01); *H01M 2220/20* (2013.01); *Y02E 60/122* (2013.01); *Y02T 10/7011* (2013.01)

(56) References Cited

U.S. PATENT DOCUMENTS

2009/0197162 A1* 8/2009 Shinyashiki ............ H01M 2/22
                                                        429/161
2016/0049635 A1   2/2016 Park et al.

FOREIGN PATENT DOCUMENTS

| JP | 2007-149353 A   | 6/2007 |
| JP | 4061938 B2      | 3/2008 |
| JP | 2013-191366 A   | 9/2013 |
| KR | 10-2016-0021406 A | 2/2016 |

* cited by examiner

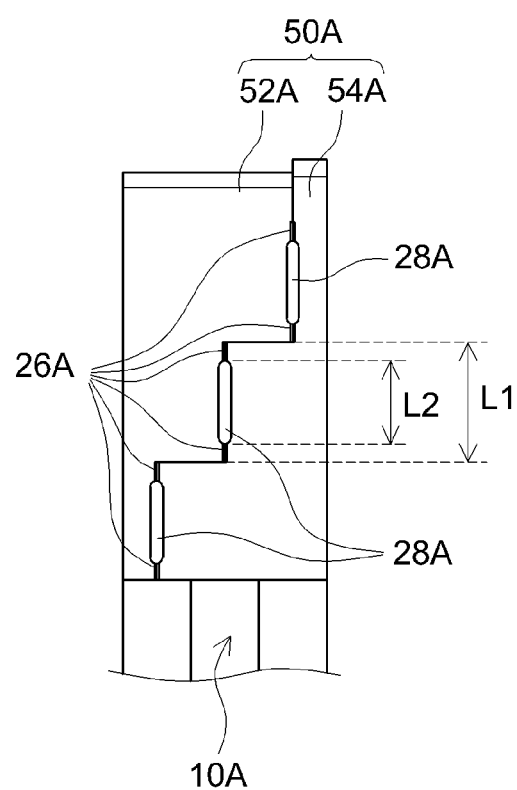

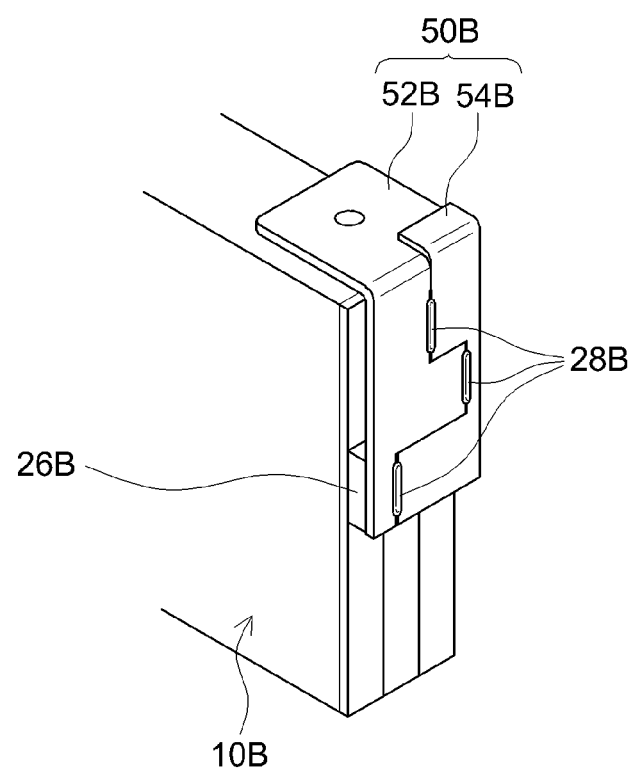

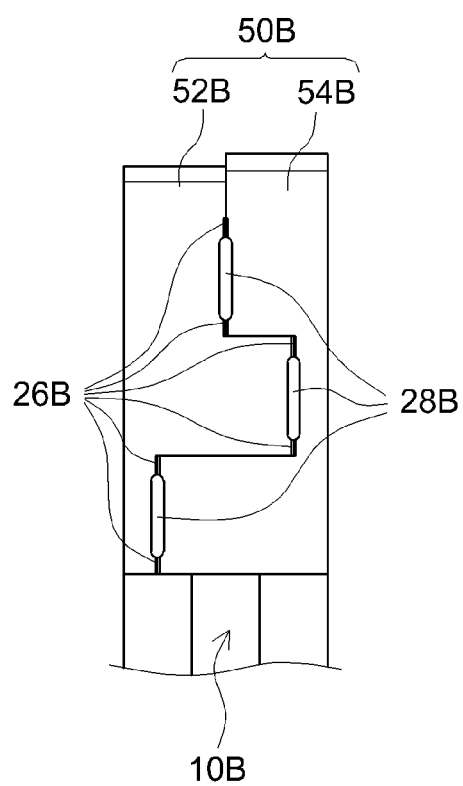

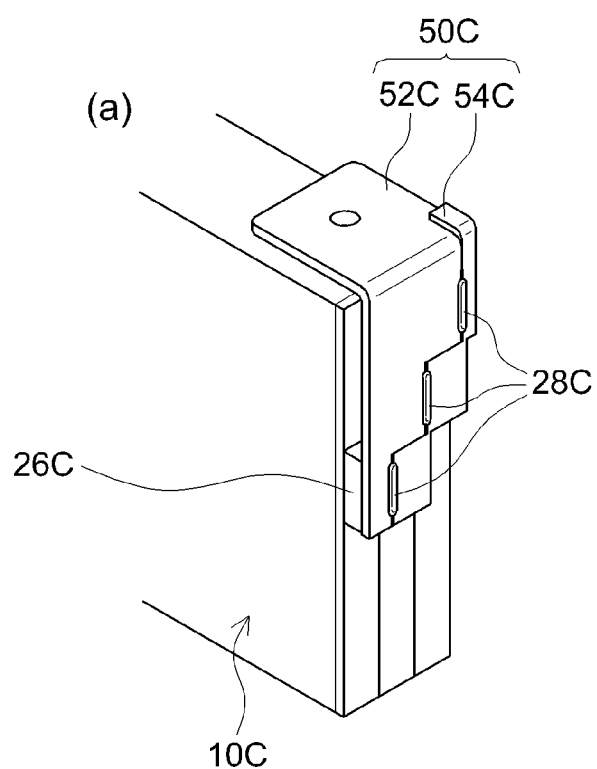

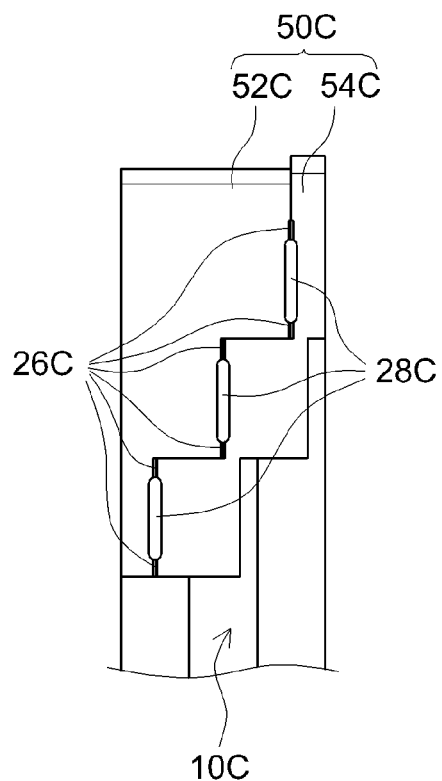

NONAQUEOUS ELECTROLYTE SECONDARY BATTERY AND PRODUCTION METHOD THEREOF

BACKGROUND OF THE INVENTION

1. Field of the Invention

The present teaching relates to a nonaqueous electrolyte secondary battery and to a production method thereof. The present application claims the rights of priority based on Japanese Patent Application No. 2017-068730 filed on Mar. 30, 2017, the entire contents of which are incorporated herein by reference.

2. Description of the Related Art

In recent years, nonaqueous electrolyte secondary batteries such as lithium ion secondary batteries have come to being suitably used as, for example, portable power sources in personal computers, mobile terminals and the like, and as power sources for vehicle drive in electric vehicles (EV), hybrid vehicles (HV), plug-in hybrid vehicles (PHV) and the like.

Common lithium ion secondary batteries have a configuration wherein an electrode body in which a positive electrode and a negative electrode are stacked, and a nonaqueous electrolyte, are accommodated in a battery case. Ordinarily, such an electrode body is electrically connected, via electrode collector terminals, to electrode external terminals that are provided in the battery case. To produce a lithium ion secondary battery having such a configuration, collector portions provided in the electrodes are grouped and inserted into slits of respective electrode collector terminals, and then the electrode collector terminals and the portions of the collector portions protruding through the slits are laser-welded (see for instance Japanese Patent Application Publication No. H10-106536).

SUMMARY OF THE INVENTION

Studies by the inventors have revealed that the problem of breakage, caused by contact between the slits and collector portions of the electrodes that make up the electrode body, during insertion of the collector portions into the slits. Although breakage in the collector portions can be suppressed by increasing slit width, the inventors found a further problem in that an increased slit width might result in a laser beam passing through the slits, during laser welding, thereby damaging the electrode body. Such breakage of the electrode collector portions and damage to the electrode body during welding give rise to component defects and product failure, and causes drops in the yield of the nonaqueous electrolyte secondary battery.

It is an object of the present teaching to provide a nonaqueous electrolyte secondary battery that can be produced with high yield, through suppression of breakage of the electrode collector portions during production, and through suppression of damage to the electrode body during welding.

The nonaqueous electrolyte secondary battery disclosed herein is provided with: an electrode body in which a plurality of electrodes are stacked; and a nonaqueous electrolyte. Each electrode has a collector and an active material layer formed on the collector. Each electrode has a collector portion being an active material layer non-forming portion. The collector portions of the electrodes are grouped and are clamped, in the stacking direction of the electrode body, by two or more members of an electrode collector terminal that is made up of the members. The collector portions of the electrodes and the members that clamp the collector portions are welded.

In such a configuration the collector portions of the electrode body are clamped by the plurality of members as the electrode collector terminal; as a result, it becomes possible to solve the problem of breakage, which is caused by contact of the collector portions of the electrode body with the slits during insertion of the collector portions into the slits and which can occur in conventional electrode collector terminals provided with slits. Since the collector portions of the electrode body are clamped by a plurality of members as an electrode collector terminal, it becomes moreover possible to solve the problem of damage to the electrode body, which is caused by passage of a laser beam for welding through the slits, due to distortion of the electrode collector terminal and which can occur in conventional electrode collector terminals provided with slits. That is, such a configuration allows providing a nonaqueous electrolyte secondary battery that can be produced with high yield, through suppression of breakage of the electrode collector portions during production and through suppression of damage to the electrode body during welding.

In a desired implementation of the nonaqueous electrolyte secondary battery disclosed herein, the collector portions of the electrodes of the electrode body are grouped into a plurality of groups and are clamped by the members of the electrode collector terminal. The plurality of groups is disposed so as not to overlap each other in the stacking direction of the electrode body. The plurality of groups is disposed at different levels in the stacking direction of the electrode body.

Such a configuration allows reducing the length of weld portions in the stacking direction of the groups of the collector portions, and welding becomes easy. Further, it becomes possible to reduce the total amount of collector portions.

In a more desired implementation of the nonaqueous electrolyte secondary battery disclosed herein, the electrode collector terminal is made up of a first member and a second member. The plurality of groups is disposed in a step-like fashion and is clamped by the first member and the second member. Portions of the first member and the second member that clamp the plurality of groups have shapes conforming to the step-like plurality of groups. In at least one of the first member and the second member, the dimension, in the stacking direction of the electrode body, of a portion between a portion at which the member abuts one group and a portion at which the member abuts another group is smaller than the dimension, in the stacking direction, of the portion at which the member abuts the one group and the dimension, in the stacking direction, of the portion at which the member abuts the other group.

In such a configuration, the portion of the member making up the electrode collector terminal, at which the dimension is small can deform readily by a load in the load direction, and therefore adhesion of the collector portions and the members that make up the electrode collector terminal can be further enhanced. As a result, it becomes possible to further suppress the occurrence of defects at weld portions, and to further increase yield.

In a desired implementation of the nonaqueous electrolyte secondary battery disclosed herein, the nonaqueous electrolyte secondary battery is further provided with a current interrupt device attached to the electrode collector terminal.

Such a configuration allows suppressing the occurrence of operation malfunction (defective attachment) of the current interrupt device which is derived from distortion in the electrode collector terminal and which can occur in an electrode collector terminal provided with slits in conventional techniques. Yield can therefore be further increased.

A method for producing a nonaqueous electrolyte secondary battery disclosed herein includes the steps of: producing a plurality of electrodes each including a collector and an active material layer formed on the collector, and including a collector portion being an active material layer non-forming portion; producing an electrode body by stacking the plurality of electrodes; grouping the collector portions of the electrodes of the electrode body, and then clamping the collector portions, in the stacking direction of the electrode body, by two or more members of an electrode collector terminal that is made up of the members; and welding the collector portions of the electrodes and the members that clamp the collector portions.

In such a configuration, the collector portions of the electrode body are clamped by the plurality of members as the electrode collector terminal; as a result, it becomes possible to solve the problem of breakage, which is caused by contact of the collector portions of the electrode body with the slits during insertion of the collector portions into the slits and which can occur in conventional electrode collector terminals provided with slits. Since the collector portions of the electrode body are clamped by a plurality of members as an electrode collector terminal, it becomes moreover possible to solve the problem of damage to the electrode body which is caused by passage of a laser beam for welding through the slits, due to distortion of the electrode collector terminal and which can occur in conventional electrode collector terminals provided with slits. That is, such a configuration allows producing a nonaqueous electrolyte secondary battery with high yield, through suppression of breakage of the electrode collector portions during production and through suppression of damage to the electrode body during welding.

In a desired implementation of the method for producing a nonaqueous electrolyte secondary battery disclosed herein, in the clamping step, the collector portions of the electrodes of the electrode body are grouped into a plurality of groups and are clamped by the members of the electrode collector terminal. The plurality of groups is clamped so as not to overlap each other in the stacking direction of the electrode body, and the plurality of groups is clamped while being disposed at different levels in the stacking direction of the electrode body.

Such a configuration allows reducing the length of weld portions in the stacking direction of the groups of the collector portions, and welding becomes easy. Further, it becomes possible to reduce the total amount of collector portions.

In a more desired implementation of the method for producing a nonaqueous electrolyte secondary battery disclosed herein, the electrode collector terminal is made up of a first member and a second member. In the clamping step, the plurality of groups disposed in a step-like fashion is clamped by the first member and the second member. Portions of the first member and the second member that clamp the plurality of groups have shapes conforming to the step-like plurality of groups. In at least one of the first member and the second member, the dimension, in the stacking direction of the electrode body, of a portion between a portion at which the member abuts one group and a portion at which the member abuts another group is smaller than the dimension, in the stacking direction, of the portion at which the member abuts the one group and the dimension, in the stacking direction, of the portion at which the member abuts the other group.

In such a configuration, the portion of the member making up the electrode collector terminal, at which the dimension is small can deform readily by a load in the load direction, and therefore adhesion of the collector portions and the members that make up the electrode collector terminal can be further enhanced. As a result, it becomes possible to further suppress the occurrence of defects at weld portions, and to further increase yield.

In a desired implementation of the method for producing a nonaqueous electrolyte secondary battery disclosed herein, the method further includes a step of attaching a current interrupt device to the electrode collector terminal.

Such a configuration allows suppressing the occurrence of operation malfunction (defective attachment) of the current interruption device which is derived from distortion in the electrode collector terminal and which can occur in an electrode collector terminal provided with slits in conventional techniques. Yield can therefore be further increased.

BRIEF DESCRIPTION OF THE DRAWINGS

FIG. 3B is a side-view diagram of the positive electrode side of the electrode body;

FIG. 4A is a perspective-view diagram of a side end portion of a positive electrode side of an electrode body in a first variation of a lithium ion secondary battery according to an embodiment of the present teaching; FIG. 4B is a side-view diagram of the positive electrode side of the electrode body;

FIG. 5A is a perspective-view diagram of a side end portion of a positive electrode side of an electrode body in a second variation of a lithium ion secondary battery according to an embodiment of the present teaching; FIG. 5B is a side-view diagram of the positive electrode side of the electrode body.

DESCRIPTION OF THE PREFERRED EMBODIMENTS

Figure 1:
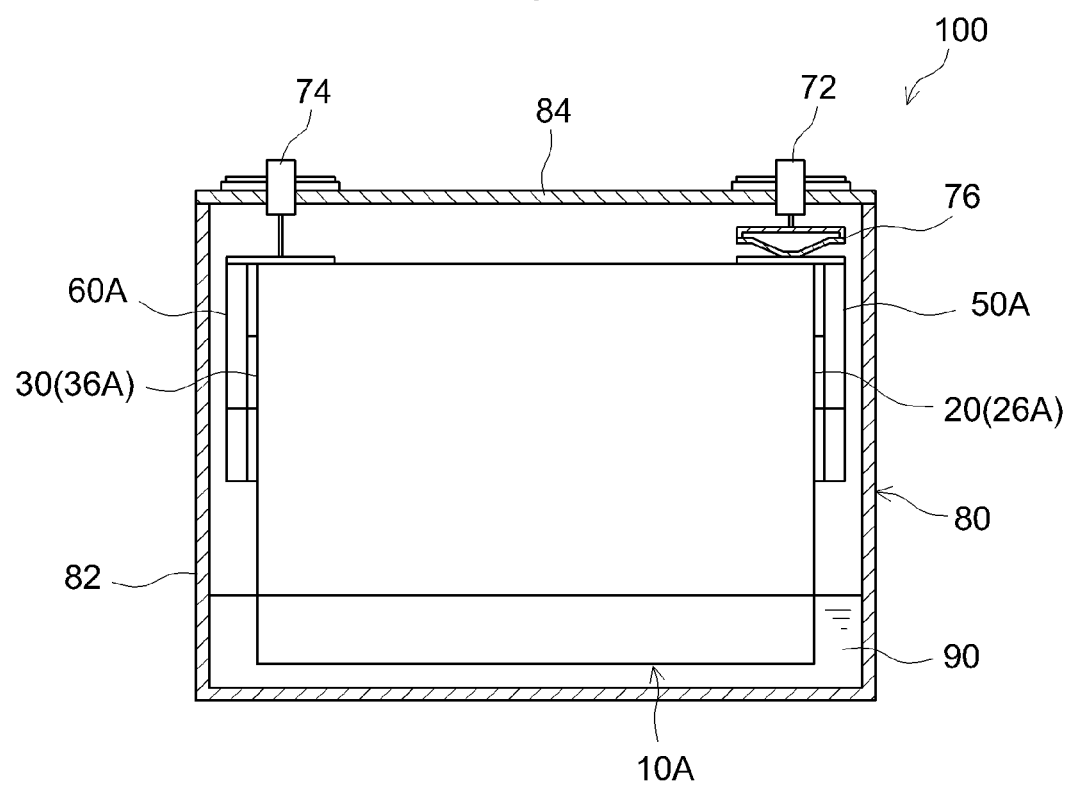
FIG. 1 is a cross-sectional diagram illustrating schematically the configuration of a lithium ion secondary battery according to an embodiment of the present teaching.

Embodiments of the present teaching will be explained below with reference to accompanying drawings. Any features other than the matter specifically set forth in the present specification and that may be necessary for carrying out the present teaching (for example, ordinary configurations and ordinary production processes of nonaqueous electrolyte secondary battery, not being characterizing features of the present teaching) can be regarded as instances of design matter, for a person skilled in the art, based on known techniques in the relevant technical field. The present teaching can be realized on the basis of the disclosure of the present specification and common technical knowledge in the relevant technical field. In the drawings below, members and portions that exhibit identical effects are denoted with identical reference symbols. The dimensional relationships (length, width, thickness and so forth) in the figures do not necessarily reflect actual dimensional relationships.

FIG. 1 is a cross-sectional diagram illustrating schematically the configuration of a lithium ion secondary battery 100 being an example of a nonaqueous electrolyte secondary battery according to the present embodiment.

In the present specification, the term "secondary battery" denotes ordinarily an electric storage device that can be repeatedly charged and discharged, and encompasses so-called storage batteries and electric storage elements such as electrical double layer capacitors. In the present specification the term "lithium ion secondary battery" denotes a secondary battery that utilizes lithium ions as charge carriers, and that is charged and discharged as a result of movement of charge with lithium ions, between a positive electrode and a negative electrode.

The lithium ion secondary battery 100 is provided with: an electrode body 10A in which a plurality of electrodes are stacked; and a nonaqueous electrolyte 90. The electrode body 10A and the nonaqueous electrolyte 90 are accommodated in a battery case 80. The battery case 80 is made up of a case body 82 having an opening and a case lid 84 that plugs the opening. The case lid 84 is provided with a safety valve (not shown) set so as to release the internal pressure of the battery case 80 when the internal pressure rises to or above a predetermined level, and with an injection port (not shown) for injecting the nonaqueous electrolyte 90. Examples of materials that can be used as the material of the battery case 80 include for instance metallic materials (for example, aluminum) that are lightweight and have good thermal conductivity. However, the materials are not limited thereto, and for instance a resin may be used herein.

As illustrated in FIG. 1, a positive electrode 20 of the electrode body 10A is connected to a positive electrode external terminal 72 that is attached to the case lid 84, via a positive electrode collector terminal 50A attached to a positive electrode collector portion 26A. A negative electrode 30 of the electrode body 10A is connected to a negative electrode external terminal 74 that is attached to the case lid 84, via a negative electrode collector terminal 60A attached to a negative electrode collector portions 36A.

In FIG. 1 a current interrupt device (CID) 76 is provided in the path between the positive electrode collector terminal 50A and the positive electrode external terminal 72. The current interrupt device 76 is provided with a reverse plate that interrupts current by flipping when the internal pressure of the battery case 80 rises to or above a predetermined level. The current interrupt device 76 may be attached to the negative electrode collector terminal 60A and be provided in the path between the negative electrode collector terminal 60A and the negative electrode external terminal 74.

A nonaqueous electrolyte the same as or similar to those used in conventional lithium ion secondary batteries (for instance a nonaqueous electrolyte resulting from dissolving a supporting salt such as a lithium salt in a nonaqueous solvent such as a carbonate) can be used herein as the nonaqueous electrolyte 90.

Figure 2:
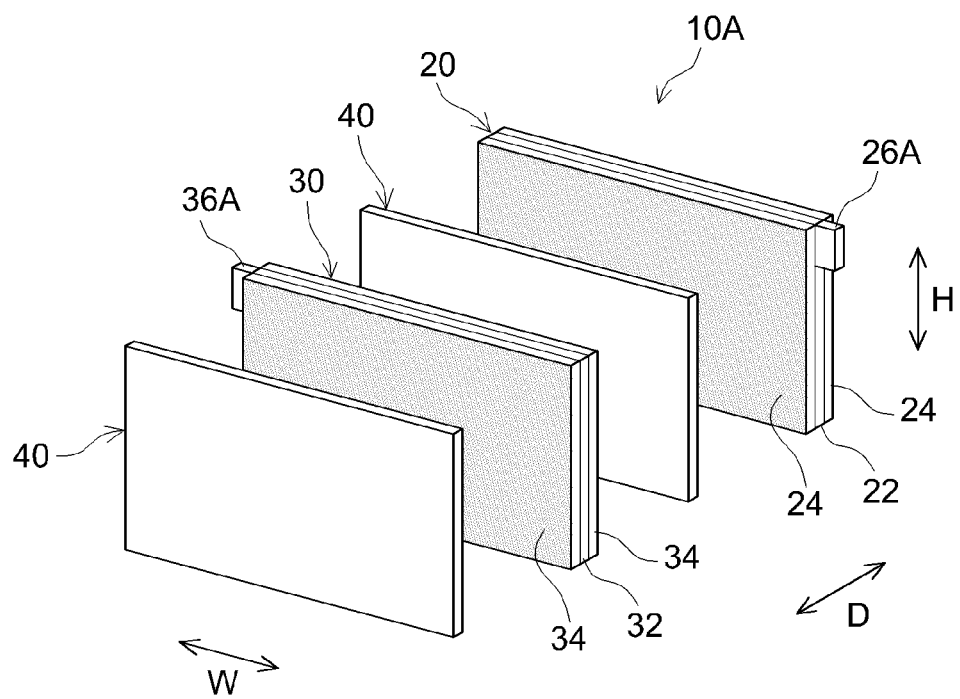
FIG. 2 is an exploded perspective-view diagram of part of an electrode body of a lithium ion secondary battery according to an embodiment of the present teaching.

FIG. 2 illustrates an exploded perspective-view diagram of part of the electrode body 10A of the lithium ion secondary battery 100. The reference symbol W in the figure denotes the transverse direction of the lithium ion secondary battery 100, the reference symbol D denotes the thickness direction of the lithium ion secondary battery 100, and the reference symbol H denotes the height direction of the lithium ion secondary battery 100.

The electrode body 10A has a structure in which the positive electrode 20 and the negative electrode 30 are stacked on each other across a separator 40. Although not shown in the figure, a plurality of positive electrodes 20 and a plurality of negative electrodes 30 are stacked alternately across respective interposed separators 40. The stacking direction of the electrode body 10A is herein the thickness direction D.

The positive electrode 20 is provided with a positive electrode collector 22 and a positive electrode active material layer 24 formed on the positive electrode collector 22. For instance a metal foil such as an aluminum foil is suitably used for the positive electrode collector 22. In the example of the figure, the positive electrode active material layer 24 is provided on both faces of the positive electrode collector 22. The positive electrode active material layer 24 is formed, in the transverse direction W, to the same width as the entire width of the positive electrode collector 22, excluding the positive electrode collector portion 26A.

The positive electrode active material layer 24 contains a positive electrode active material. One or two or more substances conventionally used as positive electrode active materials in lithium ion secondary batteries can be used herein, without particular limitations, as the positive electrode active material. Examples include for instance lithium transition metal composite oxides such as lithium-nickel-cobalt-manganese composite oxides (for instance $LiNi_{1/3}Co_{1/3}Mn_{1/3}O_2$), lithium-nickel composite oxides (for instance $LiNiO_2$), lithium-cobalt composite oxides (for instance $LiCoO_2$) and lithium-nickel-manganese composite oxides (for instance $LiNi_{0.5}Mn_{1.5}O_4$). Besides the positive electrode active material described above, the positive electrode active material layer 24 may contain a conductive material such as acetylene black (AB), and a binder such as polyvinylidene fluoride (PVDF) or styrene butadiene rubber (SBR).

The positive electrode 20 has the positive electrode collector portion (i.e. a positive electrode collector foil) 26A that is a positive electrode active material layer non-forming portion and that protrudes in the transverse direction W from the side face of the electrode body 10A. The positive electrode active material layer 24 is not formed in the positive electrode collector portion 26A, and accordingly the positive electrode collector 22 is exposed at the positive electrode collector portion 26A. The shape of the positive electrode collector portion 26A is not limited to that illustrated in the figure. The position of the positive electrode collector portion 26A in the height direction H varies as described below.

The negative electrode 30 is provided with a negative electrode collector 32 and a negative electrode active material layer 34 formed on the negative electrode collector 32. For instance a metal foil such as a copper foil is suitably used for the negative electrode collector 32. In the example of the figure, the negative electrode active material layer 34 is provided on both faces of the negative electrode collector 32. The negative electrode active material layer 34 is formed, in the transverse direction W, to the same width as the entire width of the negative electrode collector 32, excluding the negative electrode collector portions 36A.

The negative electrode active material layer 34 contains a negative electrode active material. One or two or more substances conventionally used as negative electrode active materials in lithium ion secondary batteries can be used herein, without particular limitations, as the negative electrode active material. Examples include for instance carbon materials such as graphite carbon and amorphous carbon, as well as lithium-transition metal nitrides. Besides the negative electrode active material described above, the negative electrode active material layer 34 may contain a binder such as polyvinylidene fluoride (PVDF) or styrene butadiene rubber (SBR), and a thickener such as carboxymethyl cellulose (CMC).

The negative electrode 30 has the negative electrode collector portion (i.e. a negative electrode collector foil) 36A that is a negative electrode active material layer non-forming portion and that protrudes in the transverse direction W from the side face of the electrode body 10A. The negative electrode collector portion 36A protrudes in a direction opposite that of the positive electrode collector portion 26A. The negative electrode active material layer 34 is not formed in the negative electrode collector portion 36A, and accordingly the negative electrode collector 32 is exposed at the negative electrode collector portion 36A. The shape of the negative electrode collector portion 36A is not limited to that illustrated in the figure. The position of the negative electrode collector portion 36A in the height direction H varies as described below.

The separator 40 is an insulating member that separates the positive electrode 20 and the negative electrode 30. In the present example, the separator 40 is made up of a sheet of a predetermined width with a plurality of small holes. For instance a separator of single layer structure or a separator of multilayer structure, made up of a porous polyolefin resin, can be used herein as the separator 40. The separator 40 may have a heat-resistant layer (HRL).

Figure 3A:
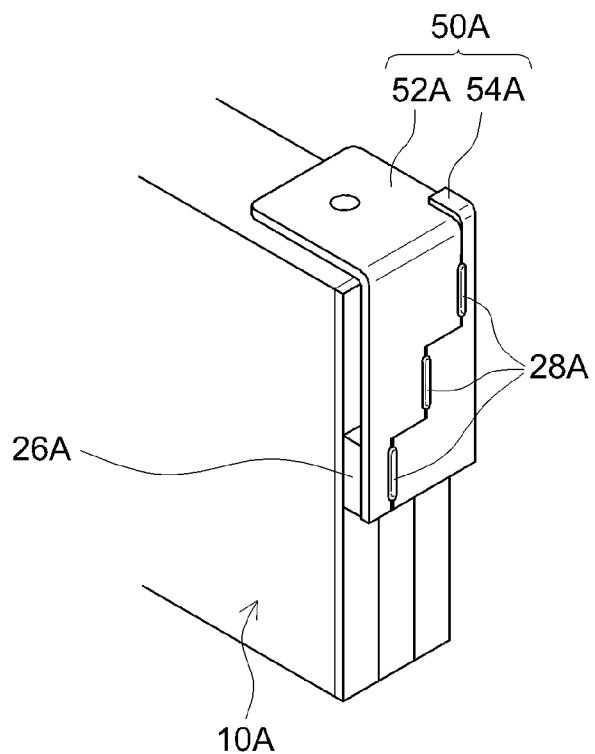
FIG. 3A is a perspective-view diagram of a side end portion of a positive electrode side of an electrode body of a lithium ion secondary battery according to an embodiment of the present teaching.

FIG. 3A illustrates a perspective-view diagram of a side end portion of the positive electrode 20 side of the electrode body 10A. FIG. 3B illustrates a side-view diagram of the positive electrode 20 side of the electrode body 10A.

As illustrated in FIGS. 3A and 3B, the positive electrode collector terminal 50A is made up of two members, namely a first terminal member 52A and a second terminal member 54A. The top face of the positive electrode collector terminal 50A abuts the current interrupt device 76.

A plurality of positive electrode collector portions 26A is divided and grouped into three groups, through variation of the position thereof. The three groups are disposed in a step-like fashion. Specifically, the three groups are displaced in order from one end of the electrode body 10A towards the other end, along the stacking direction of the electrode body 10A. The portions of the terminal member 52A and of the terminal member 54A that clamp the groups of the positive electrode collector portions 26A have shapes that conform to the step-like shape of the plurality of groups, each group being clamped in the stacking direction by the terminal member 52A and the terminal member 54A.

Weld portions 28A are formed through welding of the positive electrode collector portions 26A with the terminal member 52A and the terminal member 54A. The length L2 of each weld portion 28A in the height direction H is shorter than the length L1, in the height direction, over which one group of the positive electrode collector portions 26A abuts the terminal member 52A and the terminal member 54A.

The positive electrode collector portions 26A are clamped by the plurality of terminal members (first terminal member 52A and second terminal member 54A); as a result, it becomes possible to solve the problem of breakage, which is caused by contact of the collector portions of the electrode body with the slits during insertion of the collector portions into the slits and which can occur in conventional electrode collector terminals provided with slits. Since the positive electrode collector portions 26A are clamped by the plurality of terminal members (terminal member 52A and the terminal member 54A), it becomes possible to solve the problem of damage to the electrode body which is caused by passage of a laser beam for welding through the slits, due to distortion of the electrode collector terminal and which can occur in conventional electrode collector terminals provided with slits.

This allows suppressing the occurrence of operation malfunction (defective attachment) of the current interrupt device derived from distortion in the electrode collector terminal.

The number of groups made up of the divided positive electrode collector portions 26A is not limited to that illustrated in the figure. The positive electrode collector portions 26A may be just one group in a case where the electrode body 10A is thin.

In terms of reliability of the weld portions 28, desirably all the positive electrode collector portions (i.e. positive electrode collector foil) 26A are welded in a state where the plurality of positive electrode collector portions 26A and the terminal member 52A and a terminal member 54B are in close contact.

Accordingly, the number of groups of positive electrode collector portions 26A (in other words, the number into which the positive electrode collector portions 26A are divided) is plural, the plurality of groups being disposed so as not to overlap each other in the stacking direction of the electrode body 10A. Desirably, the plurality of groups is disposed at different levels in the stacking direction of the electrode body 10A.

This allows reducing the length of weld portions 28 in the stacking direction of the groups of the positive electrode collector portions 26A, and welding becomes easy. Further, it becomes possible to reduce the total amount of positive electrode collector portions 26A.

More desirably, the number of groups made up of the divided positive electrode collector portions 26A is two to six. When the number of groups is small, the number of positive electrode collector portions (i.e. positive electrode collector foil) 26A per weld portion 28 increases, and accordingly there increases the length in the stacking direction (also direction D in FIG. 2) of the groups. When the length of the groups in the stacking direction is large, the length of the positive electrode collector portions 26A in the projecting direction must be increased. That is because the positive electrode collector portions 26A are allowed to protrude from between the terminal member 52A and the terminal member 54B in a case where the positive electrode collector portions 26A are grouped before welding, and the resulting groups are clamped collectively by the terminal member 52A and the terminal member 54B. When the length of the groups in the stacking direction is large, the length of protrusion from between the terminal member 52A and the terminal member 54B increases towards the center of the group. As a result, the heat required for welding is larger, and in consequence adverse effects on the separator 40 of the electrode body 10A may arise on account of a significant amount of heat during welding, while costs may rise due to for instance to an increase in the size of the device necessary for welding. If on the other hand the number of groups is too large, the shape of the positive electrode collector terminal 50A may become complex, and moreover, the positioning precision during clamping of the positive electrode collector portions 26A is higher in that case, whereby the positioning operation may become more cumbersome.

The positive electrode collector terminal 50A is made up of two members, i.e. the terminal member 52A and the terminal member 54A, but may be made up of more than two members, depending on the number of groups of the positive electrode collector portions 26A.

The plurality of groups of the positive electrode collector portions 26A in FIGS. 3A and 3B are disposed so that the groups do not overlap in the stacking direction of the electrode body 10A. The three groups are disposed in a step-like fashion, in such a way that the plurality of groups is disposed at different levels in the stacking direction of the electrode body 10A. However, the arrangement of the positive electrode collector portions 26A is not limited to a step-like fashion.

FIGS. 4A and 4B illustrate an electrode body 10B of a first variation of the lithium ion secondary battery 100 according to the present embodiment. FIG. 4A is a perspective-view diagram of a side end portion of the positive electrode side of the electrode body 10B. FIG. 4B is a side-view diagram of the positive electrode side of the electrode body 10B.

As illustrated in FIGS. 4A and 4B, a positive electrode collector terminal 50B is made up of two members, namely a first terminal member 52B and the second terminal member 54B.

A plurality of positive electrode collector portions 26B is divided and grouped into three groups. Unlike the example of FIGS. 3A and 3B, in the present example the three groups are not disposed in a step-like fashion. However, the three groups are disposed so as not to overlap each other in the stacking direction of the electrode body 10B. The plurality of groups is disposed at different levels in the stacking direction of the electrode body 10B.

The portions of the terminal member 52B and the terminal member 54B that clamps the groups of the positive electrode collector portions 26B have a shape that conforms to the groups, each group being clamped by the terminal member 52B and the terminal member 54B.

Weld portions 28B are formed through welding of the positive electrode collector portions 26B with the terminal member 52B and the terminal member 54B.

Also in the first variation illustrated in FIGS. 4A and 4B, the number of groups of the positive electrode collector portions 26B is plural, the plurality of groups being disposed so as not to overlap each other in the stacking direction of the electrode body 10B. The plurality of groups is disposed at different levels in the stacking direction of the electrode body 10B. Therefore, the reliability of the weld portions 28B is high.

Figure 5C:
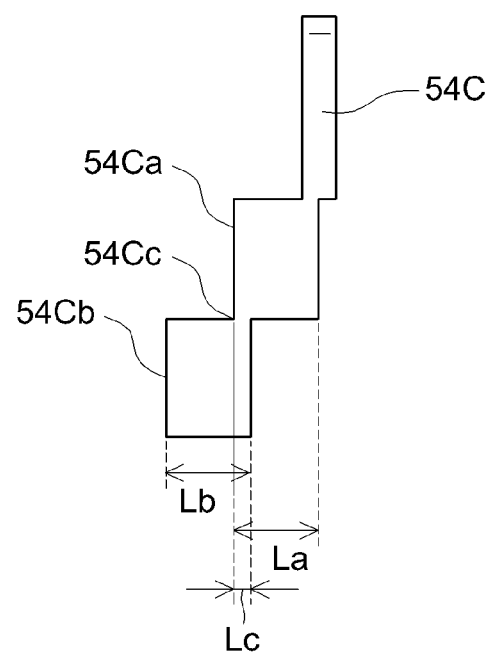
FIG. 5C is a plan-view diagram of one member that makes up a positive electrode collector terminal.

FIGS. 5A to 5C illustrate an electrode body 10C of a second variation of the lithium ion secondary battery 100 according to the present embodiment. FIG. 5A is a perspective-view diagram of a side end portion of the positive electrode side of the electrode body 10C, FIG. 5B is a side-view diagram of the positive electrode side of the electrode body 10C, and FIG. 5C is a plan-view diagram of one member 54C that makes up a positive electrode collector terminal 50C.

As illustrated in FIGS. 5A to 5C, the positive electrode collector terminal 50C is made up of two members, namely a first terminal member 52C and a second terminal member 54C.

A plurality of positive electrode collector portions 26C is divided and grouped into three groups. The three groups are disposed in a step-like fashion.

The portions of the terminal member 52C and the terminal member 54C that clamp the groups of the positive electrode collector portions 26C have shapes that conform to the groups, each group being clamped by the terminal member 52C and the terminal member 54C.

Weld portions 28C are formed through welding of the positive electrode collector portions 26C with the terminal member 52C and the terminal member 54C.

In the second variation, the shape of the terminal member 54C of the positive electrode collector terminal 50C is different from that of the example illustrated in FIGS. 3A and 3B. In the second variation, specifically, the terminal member 54C of the positive electrode collector terminal 50C is formed in a step-like fashion also at the end on the side opposite that of the end at which there are clamped the groups in the stacking direction of the electrode body 10C.

As a result, a dimension Lc, in the stacking direction of the electrode body 10C, (of a portion 54Cc) between a portion 54Ca, of the terminal member 50C, abutting one group and a portion 54Cb abutting another group is smaller than a dimension La, in the stacking direction, of the portion 54Ca abutting the one group and a dimension Lb, in the stacking direction, of the portion 54Cb abutting the other group.

In such a configuration, when the positive electrode collector portions 26C are clamped by the terminal member 52C and the terminal member 54C, the portion 54Cc of small dimension between the portion 54Ca, of the terminal member 50C, abutting one group, and the portion 54Cb abutting another group, is readily deformed by a load in the load direction of the terminal, and therefore adhesion of the positive electrode collector portions 26C, the terminal member 52C and the terminal member 54C can be further enhanced. As a result, it becomes possible to further suppress the occurrence of defects at weld portions, and to further increase yield.

At the other terminal member 52C of the positive electrode collector terminal 50C, the dimension, in the stacking direction of the electrode body, of the portion between the portion abutting one group and the portion abutting against the other group may be smaller than the dimension, in the stacking direction, of the portion abutting the one group and the dimension, in the stacking direction, of the portion abutting the other group. Both the terminal member 52C and the terminal member 54C may be configured in such a way.

In all the examples, only the positive electrode 20 side has been specifically explained, but the negative electrode 30 side as well has the same configuration. However, the above-described configuration may alternatively be adopted in only one of the positive electrode 20 side and the negative electrode 30 side.

A method for producing a nonaqueous electrolyte secondary battery according to the present embodiment will be explained next. The method for producing a nonaqueous electrolyte secondary battery according to the present embodiment includes: a step (electrode production step) of producing a plurality of electrodes each including a collector and an active material layer formed on the collector, and including a collector portion being an active material layer non-forming portion; a step (electrode body production step) of producing an electrode body through stacking of the plurality of electrodes; a step (clamping step) of grouping the collector portions of the electrodes of the electrode body, and then clamping the collector portions in the stacking direction of the electrode body by way of two or more members of an electrode collector terminal that is made up of the members; and a step (welding step) of welding the collector portions of the electrodes and the members that clamp the collector portions.

The method for producing a nonaqueous electrolyte secondary battery according to the present embodiment will be explained in detail next, with reference to accompanying drawings, taking the above lithium ion secondary battery 100 (lithium ion secondary battery 100 illustrated in FIGS. 1 to 3) as an example.

In the electrode production step, there are produced a positive electrode 20 and a negative electrode 30 such as those illustrated in FIG. 2.

The positive electrode 20 can be produced in accordance with a known method. For instance, the positive electrode collector 22 is coated with a paste containing a constituent component of the positive electrode active material layer 24. The paste is applied so as to provide a portion not coated with the paste, along one edge of the positive electrode collector 22. Specifically, the paste is applied in such a manner that the positive electrode collector 22 is exposed along one edge. The applied paste is dried, and is pressed, as needed, to form the positive electrode active material layer 24. The portion at which the positive electrode collector 22 is exposed is cut in such a manner that there are formed the positive electrode collector portions 26A.

The negative electrode 30 can be produced in accordance with a known method. For instance, the negative electrode collector 32 is coated with a paste containing a constituent component of the negative electrode active material layer 34. The paste is applied so as to provide a portion not coated with the paste, along one edge of the negative electrode collector 32. Specifically, the paste is applied in such a manner that the negative electrode collector 32 is exposed along one edge. The applied paste is dried, and is pressed, as needed, to form the negative electrode active material layer 34. The portion at which the negative electrode collector 32 is exposed is cut in such a manner that there are formed the negative electrode collector portions 36A.

In a case where the positive electrode collector portions 26A and the negative electrode collector portions 36A in the electrode body 10A are to be divided and grouped as illustrated in FIGS. 3A and 3B, there are prepared various positive electrodes 20 and various negative electrodes 30 having different positions of the positive electrode collector portions 26A and of the negative electrode collector portions 36A.

Figure 6:
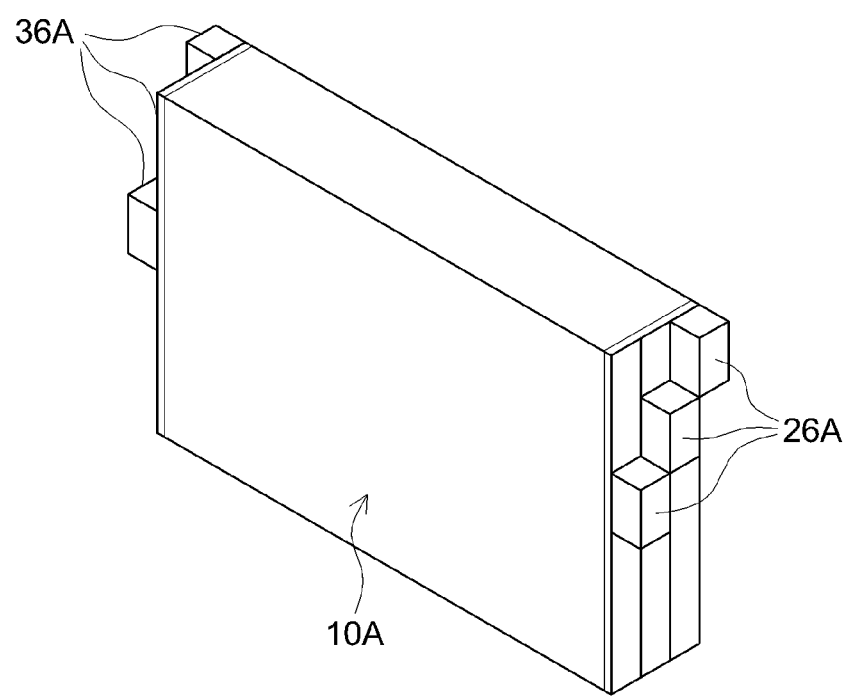
FIG. 6 is a perspective-view diagram illustrating an electrode body produced in an electrode body production step of a method for producing a lithium ion secondary battery according to an embodiment of the present teaching.

In the electrode body production step, the plurality of positive electrodes 20 and negative electrodes 30 are stacked on each other, to thereby produce an electrode body 10A such as the one illustrated in FIG. 6. Respective separators 40 are interposed between the positive electrodes 20 and the negative electrodes 30, in order to insulate the positive electrodes 20 and the negative electrodes 30. The electrodes are stacked while matching the respective positions of the positive electrode collector portions 26A and negative electrode collector portions 36A. In the example of the figure, the positive electrode collector portions 26A and the negative electrode collector portions 36A are each divided into three groups, each group being in the form of a block. The three block-shaped groups are disposed in a step-like fashion.

The above step can be carried out in accordance with a known method.

Figure 7:
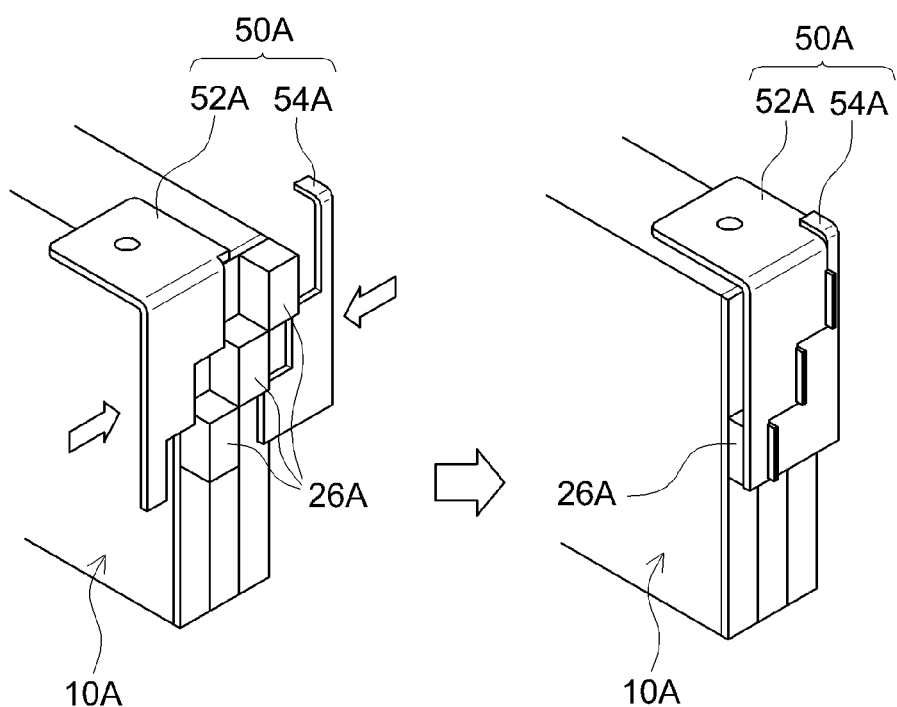
FIG. 7 is a diagram illustrating schematically a clamping step of a method for producing a lithium ion secondary battery according to an embodiment of the present teaching.

In the clamping step, just the positive electrode 20 side of the electrode body 10A has been explained in specific terms with reference to FIG. 7, but the clamping step may be carried out on the negative electrode 30 side in the same manner.

In the clamping step there is prepared the positive electrode collector terminal 50A made up of two or more members (herein the first terminal member 52A and the second terminal member 54A), as illustrated in FIG. 7. The groups of the plurality of positive electrode collector portions 26A disposed in a step-like fashion are clamped, in the stacking direction, by the terminal member 52A and the terminal member 54A, and then the terminal member 52A and the terminal member 54A are fixed.

In the example of the figure, thus, the positive electrode collector portions 26A of the electrode body 10A are grouped into a plurality of groups, and then are clamped by the terminal member 52A and the terminal member 54A of the positive electrode collector terminal 50A. The plurality of groups are clamped so as not to overlap each other in the stacking direction of the electrode body 10A. Further, the plurality of groups are clamped while being disposed at different levels in the stacking direction of the electrode body 10A.

In the welding step, the portions at which the positive electrode collector portions 26A are clamped by the terminal member 52A and the terminal member 54A are welded by laser welding or the like. As a result there are formed weld portions 28A, such as those illustrated in FIGS. 3A and 3B, at which the positive electrode collector portions 26A are joined to the terminal member 52A and the terminal member 54A. The welding step can be carried out on the negative electrode 30 side in the same manner.

The electrode body 10A can be thus produced in the above manner.

In the method for producing a nonaqueous electrolyte secondary battery according to the present embodiment, there is further carried out a step of constructing a nonaqueous electrolyte secondary battery using an electrode body. The above step can be carried out in accordance with a known method.

As a concrete example, an explanation follows next on a step of constructing the lithium ion secondary battery 100 using the above electrode body 10A.

The battery case 80 is prepared first. The battery case 80 is made up of the case body 82 having an opening and the case lid 84 that plugs the opening. The material of the battery case 80 is for instance aluminum or the like. The case lid 84 is provided with a safety valve (not shown) and an injection port (not shown).

The positive electrode collector terminal 50A and the negative electrode collector terminal 60A of the electrode body 10A are joined to the positive electrode external terminal 72 and the negative electrode external terminal 74 which are provided on the outside of the case lid 84, respectively.

A step may be performed herein of attaching the current interrupt device 76 to the positive electrode collector terminal 50A, and the current interrupt device 76 may be provided in the path between the positive electrode collector terminal 50A and the positive electrode external terminal 72, as illustrated in FIG. 1. The current interrupt device 76 may be attached to the negative electrode collector terminal 60A, and be provided in the path between the negative electrode collector terminal 60A and the negative electrode external terminal 74 on the negative electrode side. The current interrupt device 76 may be attached in accordance with a known method.

The opening of the case body 82 is then plugged by the case lid 84 while the electrode body 10A is accommodated in the case body 82, and next the case body 82 and the case lid 84 are sealed.

The nonaqueous electrolyte 90 is injected through the injection port, and the injection port is sealed.

The lithium ion secondary battery 100 can be constructed thus in the above manner.

Figure 8:
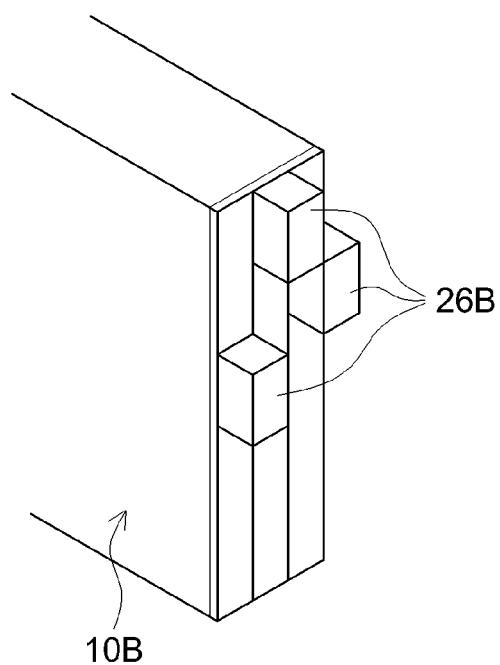
FIG. 8 is a perspective-view diagram illustrating an electrode body produced in an electrode body production step in a method for producing a first variation of lithium ion secondary battery according to an embodiment of the present teaching.

In the electrode body production step, in the production of the first variation of the nonaqueous electrolyte secondary battery according to the present embodiment, with respect to the electrode body 10B, groups of electrode collector portions (the figures illustrate only the side of the positive electrode collector portions 26B) may be disposed at different levels in the stacking direction of the electrode body, as illustrated in FIG. 8. Electrode collector terminals of a shape that conform to these groups may be used in the clamping step.

Figure 9:
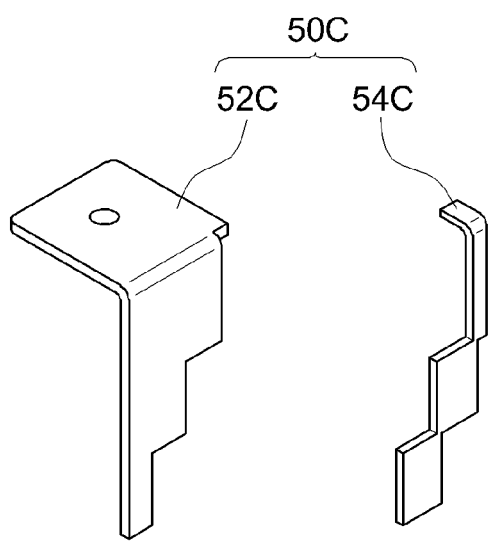
FIG. 9 is a perspective-view diagram illustrating a positive electrode collector terminal used in a clamping step in a method for producing a second variation of a lithium ion secondary battery according to an embodiment of the present teaching.

To produce the second variation of the nonaqueous electrolyte secondary battery according to the present embodiment, in the clamping step, the positive electrode collector terminal 50C made up of the first terminal member 52C and the second terminal member 54C illustrated in FIG. 9 may be used instead of the positive electrode collector terminal 50A. In the positive electrode collector terminal 50C, the dimension Lc, in the stacking direction of the electrode body 10C, of the portion 54Cc between the portion 54Ca, of the terminal member 50C, abutting one group and the portion 54Cb abutting another group, is smaller than the dimension La, in the stacking direction, of the portion 54Ca abutting the one group and the dimension Lb, in the stacking direction, of the portion 54Cb abutting the other group, as illustrated in FIGS. 5A to 5C. The same type of negative electrode collector terminal may be used also on the negative electrode side.

Examples pertaining to the present teaching will be explained below, but the teaching is not meant to be limited by these examples.

Lithium ion secondary batteries A to C described below were produced and were evaluated in accordance with the below-described procedures.

Production of Lithium Ion Secondary Batteries

Lithium Ion Secondary Battery A

An electrode body having the form illustrated in FIGS. 3A and 3B (identical configuration also on the negative electrode side) was produced in accordance with the above method, and the electrode body was used to produce a lithium ion secondary battery A. An aluminum foil with a thickness of 15 μm was used for the positive electrode collector and a copper foil with a thickness of 10 μm was used for the negative electrode collector. The positive electrode collector terminal was made of aluminum, and the thickness of the positive electrode collector terminal was set to 1.5 mm. The negative electrode collector terminal was made of copper, and the thickness of the negative electrode collector terminal was set to 1.0 mm. Three groups of collector portions having a length of 14 mm in the height direction were provided, in a step-like fashion, in the electrode body. The number of collector foils (collector portions) that made up the each group was set to 24. A current interrupt device (CID) having an actuating pressure set to 0.7 MPa or more was attached to the positive electrode side. Welding was accomplished by laser welding.

Lithium Ion Secondary Battery B

Figure 10:
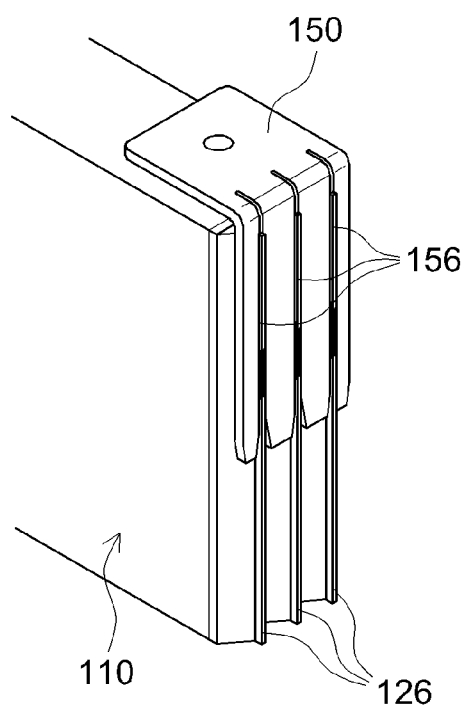
FIG. 10 is a perspective-view diagram of a side end portion of a positive electrode side of an electrode body in lithium ion secondary batteries B and C that are assessed.

An electrode body having the form illustrated in FIG. 10 (identical configuration also on the negative electrode side) was produced, and the electrode body was used to produce a lithium ion secondary battery B. An electrode body 110 illustrated in FIG. 10 has positive electrode collector portions 126 put together. The positive electrode collector portions 126 are held by a positive electrode collector terminal 150 provided with three slits 156 and made up of a single member, and the positive electrode collector portions 126 and the positive electrode collector terminal 150 are welded. The negative electrode side has the same configuration. The width (before pressing) of the slits 156 of the positive electrode collector terminal 150 in the lithium ion secondary battery B was set to 0.6 mm. An aluminum foil with a thickness of 15 μm was used in the positive electrode collector and a copper foil with a thickness of 10 μm was used in the negative electrode collector. The positive electrode collector terminal was made of aluminum, and the thickness of the positive electrode collector terminal was set to 1.5 mm. The negative electrode collector terminal was made of copper, and the thickness of the negative electrode collector terminal was set to 1.0 mm. The collector portions are provided along both edges of the electrode body. A current interrupt device (CID) having an actuating pressure set to 0.7 MPa or more was attached to the positive electrode side. Further, 24 collector foils (collector portions) were inserted into respective slits, and the whole was pressed in the transverse direction of the slits, followed by laser welding.

Lithium Ion Secondary Battery C

An electrode body having the form illustrated in FIG. 10 (identical configuration also on the negative electrode side) was produced, and the electrode body was used to produce a lithium ion secondary battery C. The width (before pressing) of the slits 156 of the positive electrode collector terminal 150 in the lithium ion secondary battery C was set to 1.0 mm. An aluminum foil with a thickness of 15 μm was used in the positive electrode collector and a copper foil with a thickness of 10 μm was used in the negative electrode collector. The positive electrode collector terminal was made of aluminum, and the thickness of the positive electrode collector terminal was set to 1.5 mm. The negative electrode collector terminal was made of copper, and the thickness of the negative electrode collector terminal was set to 1.0 mm. The collector portions are provided along both edges of the electrode body. A current interrupt device (CID) having an actuating pressure set to 0.7 MPa or more was attached to the positive electrode side. Further, 24 collector foils (collector portions) were inserted into respective slits, and the whole was pressed in the transverse direction of the slits, followed by laser welding.

Lithium ion secondary battery A corresponds to the nonaqueous electrolyte secondary battery according to the present embodiment, whereas lithium ion secondary batteries B and C are conventional nonaqueous electrolyte secondary batteries.

Evaluation of Lithium Ion Secondary Batteries

Evaluation 1: Observation of the Appearance of the Collector Portions

The occurrence or absence of breakage in the collector portions of the electrode body of each lithium ion secondary battery was investigated. Specifically, the collector foils were observed for cracking and breakage, since the collector portions are collector foils. Batteries where neither cracks nor breakage occurred in the collector foil were rated as good, and batteries where cracking or breakage occurred in the collector foil were rated as defective. 10 samples were evaluated for each lithium ion secondary battery. The evaluation results are given in Table 1 as "(Number of good samples)/(number of produced samples)".

Evaluation 2: Measurement of CID Actuating Pressure

The actuating pressure of the CID in each lithium ion secondary battery was investigated. Batteries where the actuating pressure of the CID lay in the range of 0.7 MPa to 0.8 MPa were rated as good, and batteries where the actuating pressure of the CID lay outside the above range were rated as defective. 10 samples were evaluated for each lithium ion secondary battery. The evaluation results are given in Table 1 as "(Number of good samples)/(number of produced samples)".

Evaluation 3: Observation of the Appearance of the Electrode Body at Weld Portions The welding portions of the electrode body of each lithium ion secondary battery were taken apart, and the occurrence or absence of separator burnout was investigated. Batteries where no separator burnout occurred were rated as good, and batteries where separator burnout occurred were rated as defective. 10 samples were evaluated for each lithium ion secondary battery. The evaluation results are given in Table 1 as "(Number of good samples)/(number of produced samples)".

TABLE 1

| | Electrode body form | Evaluation 1 | Evaluation 2 | Evaluation 3 |
|---|---|---|---|---|
| Battery A | Form in FIGS. 3A and 3B | 10/10 | 10/10 | 10/10 |
| Battery B | Form in FIG 10 Slit width: 0.6 mm | 8/10 | 7/10 | 9/10 |
| Battery C | Form in FIG 10 Slit width: 1.0 mm | 10/10 | 5/10 | 5/10 |

As Table 1 reveals, no defective sample was found in any of Evaluations 1 to 3 for lithium ion secondary battery A, corresponding to the nonaqueous electrolyte secondary battery according to the present embodiment.

In Evaluation 1, by contrast, a sample of conventional lithium ion secondary battery B exhibited breakage at sites of contact of the collector portions with the side face of the slits. That is because the slits of the collector terminal are thin, and the collector portions break upon contact with the side face of the slits during insertion of the collector portions into the slits.

Regarding Evaluation 2, conventional lithium ion secondary batteries B and C included samples in which the actuating pressure of the CID was low. That is because in conventional lithium ion secondary batteries B and C, an operation of closing the slits through pressing in the transverse direction of the slits is performed during attachment of the positive electrode collector terminal provided with the slits in order to elicit close contact with the collector portions, but distortion is generated in the CID attachment surface being the top face of the positive electrode collector terminal, as a result of that pressing. Lithium ion secondary battery C with a larger slit width included more defective samples.

Regarding Evaluation 3, there were samples with separator burnout in conventional lithium ion secondary batteries B and C. That is because in conventional lithium ion secondary batteries B and C, the positive electrode collector terminal becomes distorted through twisting on account of the operation of closing the slits, and a level difference arises at the leg (portion of clamping of the collector portions) of the positive electrode collector terminal, whereupon the laser for welding passes as a result through the slits at the level difference portion. Leg deformation was significant and gaps through which a laser beam passed were readily formed in lithium ion secondary battery C with a larger slit width. The number of defective samples was thus large.

Accordingly, it is found that the lithium ion secondary battery being the nonaqueous electrolyte secondary battery according to the present embodiment can be produced with good yield (material yield and product yield) through suppression of breakage of the electrode collector portions during production and suppression of damage to the electrode body during welding.

In a case where there is used a single collector terminal provided with slits, as in conventional technologies, foils may in some instances need to be collected before insertion of the collector portions into the slits of the collector terminal. The above foil collecting operation can however be omitted in the production of a lithium ion secondary battery being the nonaqueous electrolyte secondary battery according to the present embodiment.

The present teaching has been explained in detail above by means of concrete examples, but these are merely illustrative in nature, and are not meant to limit the scope of the claims. The techniques set forth in the claims include variations and modifications of the concrete example illustrated above.

What is claimed is:

1. A nonaqueous electrolyte secondary battery comprising:
   an electrode body in which a plurality of electrodes are stacked; and
   a nonaqueous electrolyte, wherein
   each of the electrodes has a collector and an active material layer formed on the collector,
   each of the electrodes has a collector portion being an active material layer non-forming portion,
   on at least one of the positive electrode side and the negative electrode side, the collector portions of the electrodes of the same side are grouped and are clamped, in the stacking direction of the electrode body, by two or more members of an electrode collector terminal that is made up of the members, and
   the collector portions of the electrodes and the members that clamp the collector portions are welded.

2. The nonaqueous electrolyte secondary battery according to claim 1, wherein
   the collector portions of the electrodes of the electrode body are grouped into a plurality of groups and are clamped by the members of the electrode collector terminal,
   the plurality of groups is disposed so as not to overlap each other in the stacking direction of the electrode body, and
   the plurality of groups is disposed at different levels in the stacking direction of the electrode body.

3. The nonaqueous electrolyte secondary battery according to claim 2, wherein
the electrode collector terminal is made up of a first member and a second member,
the plurality of groups is disposed in a step-like fashion and is clamped by the first member and the second member,
portions of the first member and the second member that clamp the plurality of groups have shapes conforming to the step-like plurality of groups, and
in at least one of the first member and the second member, the dimension, in the stacking direction of the electrode body, of a portion between a portion at which the member abuts one group and a portion at which the member abuts another group is smaller than the dimension, in the stacking direction, of the portion at which the member abuts the one group and the dimension, in the stacking direction, of the portion at which the member abuts the other group.

4. The nonaqueous electrolyte secondary battery according to claim 1, further comprising a current interrupt device attached to the electrode collector terminal.

5. A method for producing a nonaqueous electrolyte secondary battery, the method comprising the steps of:
producing a plurality of electrodes each including a collector and an active material layer formed on the collector, and including a collector portion being an active material layer non-forming portion;
producing an electrode body by stacking the plurality of electrodes;
on at least one of the positive electrode side and the negative electrode side, grouping the collector portions of the electrodes of the same side of the electrode body, and then clamping the collector portions, in the stacking direction of the electrode body, by two or more members of an electrode collector terminal that is made up of the members; and
welding the collector portions of the electrodes and the members that clamp the collector portions.

6. The method for producing a nonaqueous electrolyte secondary battery according to claim 5, wherein
in the clamping step,
the collector portions of the electrodes of the electrode body are grouped into a plurality of groups and are clamped by the members of the electrode collector terminal,
the plurality of groups is clamped so as not to overlap each other in the stacking direction of the electrode body, and
the plurality of groups is clamped while being disposed at different levels in the stacking direction of the electrode body.

7. The method for producing a nonaqueous electrolyte secondary battery according to claim 6, wherein
the electrode collector terminal is made up of a first member and a second member,
in the clamping step, the plurality of groups disposed in a step-like fashion is clamped by the first member and the second member,
portions of the first member and the second member that clamp the plurality of groups have shapes conforming to the step-like plurality of groups, and
in at least one of the first member and the second member, the dimension, in the stacking direction of the electrode body, of a portion between a portion at which the member abuts one group and a portion at which the member abuts another group is smaller than the dimension, in the stacking direction, of the portion at which the member abuts the one group and the dimension, in the stacking direction, of the portion at which the member abuts the other group.

8. The method for producing a nonaqueous electrolyte secondary battery according to claim 5,
further comprising a step of attaching a current interrupt device to the electrode collector terminal.

9. The nonaqueous electrolyte secondary battery according to claim 1, wherein on both the positive electrode side and the negative electrode side, the collector portions of the electrodes of the same side are grouped and are clamped, in the stacking direction of the electrode body, by two or more members of an electrode collector terminal that is made up of the members.

10. The nonaqueous electrolyte secondary battery according to claim 1, wherein on only one the positive electrode side and the negative electrode side, the collector portions of the electrodes of the same side are grouped and are clamped, in the stacking direction of the electrode body, by two or more members of an electrode collector terminal that is made up of the members.

11. The method for producing a nonaqueous electrolyte secondary battery according to claim 5, wherein on both the positive electrode side and the negative electrode side, the collector portions of the electrodes of the same side are grouped and are clamped, in the stacking direction of the electrode body, by two or more members of an electrode collector terminal that is made up of the members.

12. The method for producing a nonaqueous electrolyte secondary battery according to claim 5, wherein on only one the positive electrode side and the negative electrode side, the collector portions of the electrodes of the same side are grouped and are clamped, in the stacking direction of the electrode body, by two or more members of an electrode collector terminal that is made up of the members.

* * * * *